US012644496B2

(12) United States Patent
Taniguchi

(10) Patent No.: US 12,644,496 B2
(45) Date of Patent: Jun. 2, 2026

(54) CYLINDRICAL VIBRATION-DAMPING DEVICE

(71) Applicant: Sumitomo Riko Company Limited, Aichi (JP)

(72) Inventor: Tatsunori Taniguchi, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 547 days.

(21) Appl. No.: 18/165,901

(22) Filed: Feb. 7, 2023

(65) Prior Publication Data

US 2023/0296153 A1     Sep. 21, 2023

(30) Foreign Application Priority Data

Mar. 15, 2022    (JP) ................................. 2022-040480

(51) Int. Cl.
*F16F 1/38*          (2006.01)

(52) U.S. Cl.
CPC ...... *F16F 1/3821* (2013.01); *F16F 2224/025* (2013.01); *F16F 2230/0041* (2013.01); *F16F 2234/02* (2013.01)

(58) Field of Classification Search
CPC ................. F16B 21/06; F16F 2226/045; F16F 2230/0005; F16F 2234/02
See application file for complete search history.

(56) References Cited

U.S. PATENT DOCUMENTS

| | | | | | |
|---|---|---|---|---|---|
| 6,371,686 | B1 * | 4/2002 | Wu | .......................... | F16B 7/105 |
| | | | | | 135/25.1 |
| 8,939,440 | B2 * | 1/2015 | Namito | ................. | F16F 1/3842 |
| | | | | | 267/293 |
| 11,885,388 | B2 * | 1/2024 | Hotta | .................... | F16F 1/3828 |
| 2004/0108639 | A1 * | 6/2004 | Kato | ..................... | F16F 1/3863 |
| | | | | | 267/141 |
| 2015/0113797 | A1 * | 4/2015 | Cha | .......................... | B60G 7/02 |
| | | | | | 29/724 |
| 2021/0190173 | A1 * | 6/2021 | Myklebust | .............. | F16F 7/108 |

(Continued)

FOREIGN PATENT DOCUMENTS

| | | | | | | |
|---|---|---|---|---|---|---|
| CN | 112236605 | A | * | 1/2021 | .............. | F16F 7/108 |
| DE | 102016112240 | A1 | * | 1/2018 | .............. | F16F 7/108 |

(Continued)

*Primary Examiner* — Vishal R Sahni
(74) *Attorney, Agent, or Firm* — JCIPRNET

(57)          ABSTRACT

A first rotation limiting surface where a curvature is partially reduced in a circumferential direction is provided on an outer circumferential surface of an inner shaft fitting. A press-fit fitting is installed to the outer circumferential surface of the inner shaft fitting including the first rotation limiting surface. A second rotation limiting surface where a curvature is partially reduced in the circumferential direction corresponding to the first rotation limiting surface is provided on an inner circumferential surface of an insertion hole of the press-fit fitting. The first and second rotation limiting surfaces are mutually superimposed in a press-fit state. A press-fit guide surface located on a central side of the inner shaft fitting to the first rotation limiting surface and having a width dimension greater than the first rotation limiting surface is axially outer of the first rotation limiting surface on the outer circumferential surface of the inner shaft fitting.

8 Claims, 6 Drawing Sheets

(56) References Cited

U.S. PATENT DOCUMENTS

| | | | | |
|---|---|---|---|---|
| 2022/0009553 A1 * | 1/2022 | Wada | ..................... | F16F 3/093 |
| 2022/0282762 A1 * | 9/2022 | Hotta | ................... | F16F 1/3735 |

FOREIGN PATENT DOCUMENTS

| | | | | | |
|---|---|---|---|---|---|
| JP | H0177137 U | * | 5/1989 | | |
| JP | 2007263347 A | * | 10/2007 | | |
| JP | 2009236300 A | * | 10/2009 | | |
| JP | 2015161356 | | 9/2015 | | |
| KR | 102083206 B1 | * | 3/2020 | ............. | F16C 43/04 |

* cited by examiner

CYLINDRICAL VIBRATION-DAMPING DEVICE

CROSS-REFERENCE TO RELATED APPLICATION

This application claims the priority benefit of Japan application serial no. 2022-040480, filed on Mar. 15, 2022. The entirety of the above-mentioned patent application is hereby incorporated by reference herein and made a part of this specification.

BACKGROUND

Technical Field

The disclosure relates to a cylindrical vibration-damping device used in a suspension bushing of an automobile, for example.

Description of Related Art

Conventionally, a cylindrical vibration-damping device used in a suspension bushing of an automobile, etc., is known. Japanese Laid-open No. 2015-161356 (Patent Document 1) discloses a cylindrical vibration-damping device having a configuration in which an inner shaft fitting and an outer cylindrical part respectively installed to vibration-damping linking targets are linked by a main rubber elastic body.

PRIOR ART DOCUMENTS

Patent Documents

[Patent Document 1] Japanese Laid-open No. 2015-161356

In Patent Document 1, a press-fit fitting, such as a stopper fitting that limits a relative displacement amount between the inner shaft fitting and the outer cylindrical member in an axial direction is fixed to an axial end of the inner shaft fitting. By press-fitting the axial end of the inner shaft fitting into an insertion hole, the press-fit fitting is fixed to the inner shaft fitting.

Meanwhile, in the case where the shape of the press-fit fitting changes in the circumferential direction, it is required that the press-fit fitting be positioned to a specific orientation in the circumferential direction with respect to the inner shaft fitting.

However, upon the investigation of the inventors, there is a concern that, if the inner shaft fitting of a circular outer circumferential surface is press-fit into the insertion hole of a circular cross-section to fix the press-fit fitting to the inner shaft fitting, in the case where a force in the circumferential direction acts between the inner shaft fitting and the press-fit fitting, the press-fit fitting may rotate in the circumferential direction with respect to the inner shaft fitting.

As a configuration for avoiding relative rotation between the inner shaft fitting and the press-fit fitting, it is conceivable to provide a width across flats on a surface where the inner shaft fitting and the press-fit fitting are superimposed. However, in the case where the inner shaft fitting and the press-fit fitting are press-fit at the portion where the width across flats is provided, for example, issues such as that the inner shaft fitting and the press-fit fitting is relatively inclined in the radial direction where the width across flats is provided, and it is difficult to properly press-fit and assemble the inner shaft fitting and the press-fit fitting.

SUMMARY

An aspect of the disclosure provides a cylindrical vibration-damping device including: an inner shaft fitting; an outer cylindrical member; and a main rubber elastic body, elastically linking the inner shaft fitting and the outer shaft fitting. A first rotation limiting surface in which a curvature is partially reduced in a circumferential direction is provided on an outer circumferential surface of the inner shaft fitting, and a press-fit fitting is installed to the outer circumferential surface of the inner shaft fitting comprising the first rotation limiting surface. A second rotation limiting surface in which a curvature is partially reduced in the circumferential direction in correspondence with the first rotation limiting surface is provided on an inner circumferential surface of an insertion hole of the press-fit fitting into which the inner shaft fitting is inserted, and the first rotation limiting surface of the inner shaft fitting and the second rotation limiting surface of the press-fit fitting are superimposed to each other to be arranged in a press-fit state. A press-fit guide surface located on a central side of the inner shaft fitting with respect to the first rotation limiting surface and having a width dimension greater than the first rotation limiting surface is provided on an axially outer side of the first rotation limiting surface on the outer circumferential surface of the inner shaft fitting.

DESCRIPTION OF THE EMBODIMENTS

Figure 1:
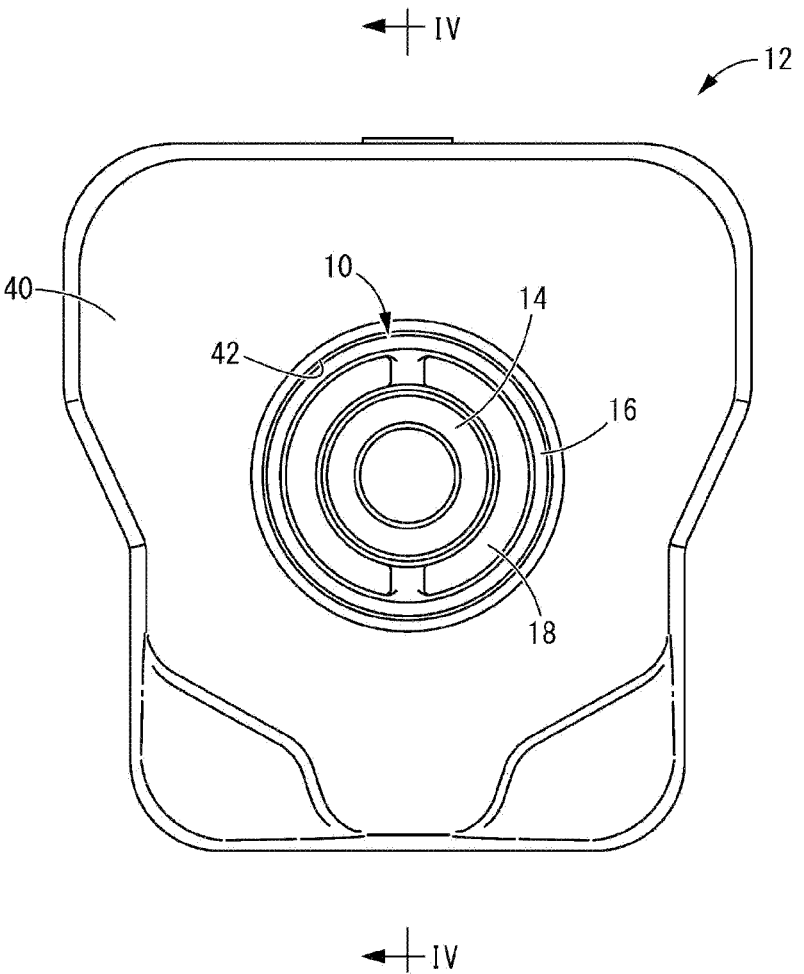
FIG. 1 is a front view illustrating a dynamic damper as a first embodiment of the disclosure.
Figure 2:
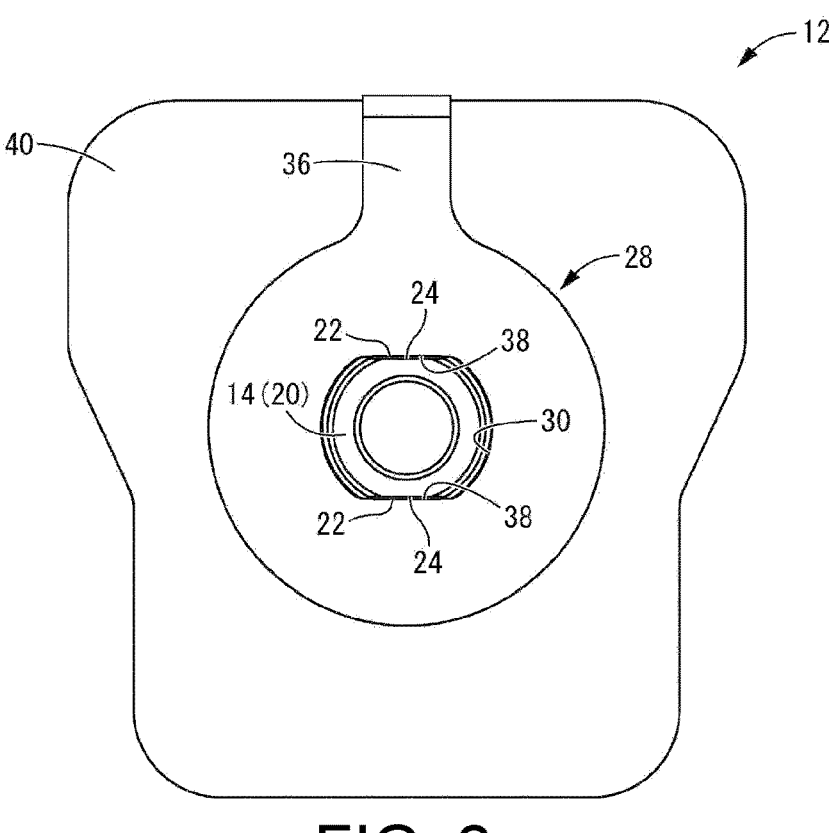
FIG. 2 is a rear view of the dynamic damper shown in FIG. 1.
Figure 3:
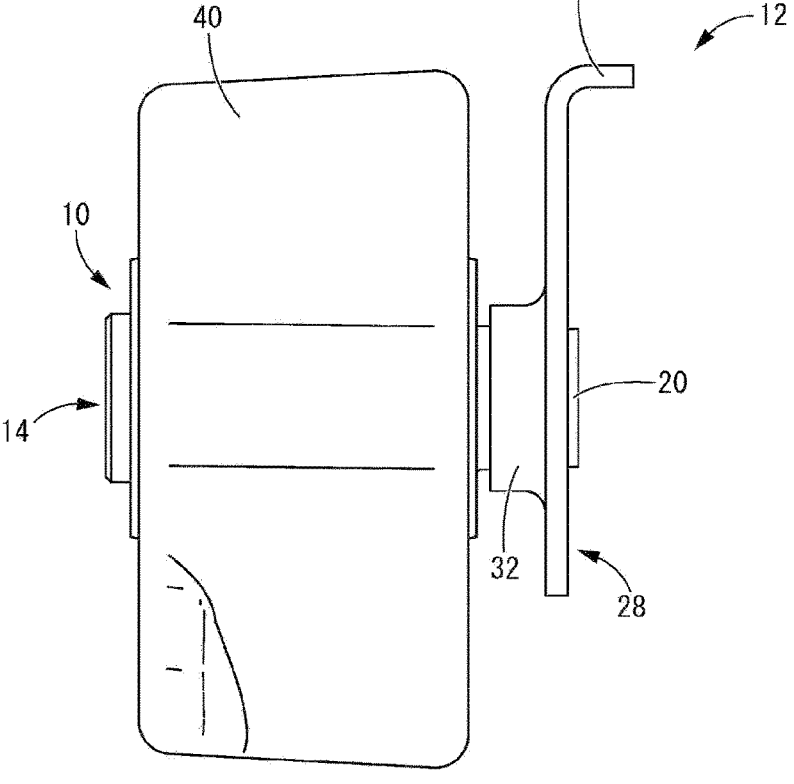
FIG. 3 is a right side view of the dynamic damper shown in FIG. 1.

The disclosure provides a cylindrical vibration-damping device with a novel configuration capable of easily realizing proper press-fit fixing between an inner shaft fitting and a press-fit fitting while preventing relative rotation between the inner shaft fitting and the press-fit fitting in the circumferential direction.

Hereinafter, exemplary embodiments for understanding the disclosure will be described, but each embodiment described below is described as an exemplary example, and may be used in combination with each other as appropriate. Multiple components described in each aspect can also be recognized and adopted independently as much as possible, and can also be adopted in combination with any component described in another aspect as appropriate. Accordingly, the disclosure can be implemented in various alternatives without being limited to the embodiments described below.

According to a first aspect, a cylindrical vibration-damping device includes: an inner shaft fitting; an outer cylindrical member; and a main rubber elastic body, elastically linking the inner shaft fitting and the outer shaft fitting. A first rotation limiting surface in which a curvature is partially reduced in a circumferential direction is provided on an outer circumferential surface of the inner shaft fitting, and a press-fit fitting is installed to the outer circumferential surface of the inner shaft fitting comprising the first rotation limiting surface. A second rotation limiting surface in which a curvature is partially reduced in the circumferential direction in correspondence with the first rotation limiting surface is provided on an inner circumferential surface of an insertion hole of the press-fit fitting into which the inner shaft fitting is inserted, and the first rotation limiting surface of the inner shaft fitting and the second rotation limiting surface of the press-fit fitting are superimposed to each other to be arranged in a press-fit state. A press-fit guide surface located on a central side of the inner shaft fitting with respect to the first rotation limiting surface and having a width dimension greater than the first rotation limiting surface is provided on an axially outer side of the first rotation limiting surface on the outer circumferential surface of the inner shaft fitting.

According to the cylindrical vibration-damping device configured according to the aspect, by superimposing the first rotation limiting surface of the inner shaft fitting and the second rotation limiting surface of the press-fit fitting whose curvatures are partially reduced in the circumferential direction, the relative rotation between the inner shaft fitting and the press-fit fitting is limited through contact between the first rotation limiting surface and the second rotation limiting surface. Even if a force in the circumferential direction acts between the inner shaft fitting and the press-fit fitting, it is difficult for the press-fit fitting to rotate in the circumferential direction with respect to the inner shaft fitting, and the relative orientation between the inner shaft fitting and the press-fit fitting in the circumferential direction can be stabilized and maintained.

The press-fit guide surface provided on the axially outer side with respect to the first rotation limiting surface of the inner shaft fitting is located closer to the central side of the inner shaft fitting than the first rotation limiting surface. Therefore, the press-fit guide surface is not strongly pressed against the second rotation limiting surface of the press-fit fitting, and can be easily pressed into the insertion hole of the press-fit fitting. In addition, in the state in which the axial end of the inner shaft fitting in which the press-fit guide surface is provided is inserted into the insertion hole of the press-fit fitting, the first rotation limiting surface of the inner shaft fitting can be press-fit to the second rotation limiting surface of the press-fit fitting. Accordingly, when the first rotation limiting surface of the inner shaft fitting is press-fit to the second rotation limiting surface of the press-fit fitting, the relative inclination between the inner shaft fitting and the press-fit fitting, etc., is limited by the contact between the press-fit guide surface of the inner shaft fitting and the press-fit fitting, and the inner shaft fitting and the press-fit fitting can be properly press-fit and fixed easily.

According to the second aspect, in the cylindrical vibration-damping device according to the first aspect, the first rotation limiting surface and the press-fit guide surface are connected by a stepped surface expanding in an axis right angle direction of the inner shaft fitting. On the inner circumferential surface of the insertion hole in the press-fit fitting, a guide inclination surface guiding the first rotation limiting surface into the insertion hole through contact of an end edge on a side of the first rotation limiting surface in the stepped surface is provided at an axial end edge part.

According to the cylindrical vibration-damping device configured according to the aspect, for example, in the case where the first rotation limiting surface and the press-fit guide surface in the inner shaft fitting are respectively formed by cutting, it is not necessary to specifically process the connection portion between the first rotation limiting surface and the press-fit guide surface, and it is easy to manufacture the inner shaft fitting including the first rotation limiting surface and the press-fit guide surface.

With the guide inclination surface provided on the axial end edge of the insertion hole, the opening of the insertion hole is arranged in an expanded shape. Therefore, it is easy to insert the axial end of the inner shaft fitting including the press-fit guide surface. In addition, by guiding the outer circumferential end edge of the stepped surface (the end edge on the side of the first rotation limiting surface) through bringing the outer circumferential end edge into contact with the guide inclination surface, the first rotation limiting surface is easily press-fit to the second rotation limiting surface.

According to the third aspect, in the cylindrical vibration-damping device according to the first aspect or the second aspect, the first rotation limiting surface is arranged as a planar surface expanding in parallel with an axial direction of the inner shaft fitting, and the press-fit guide surface is arranged as a planar surface expanding in parallel with the first rotation limiting surface.

According to the cylindrical vibration-damping device configured according to the aspect, by making the first rotation limiting surface a planar surface, an effect of limiting the rotation between the inner shaft fitting and the press-fit fitting can be obtained effectively through contact with the second rotation limiting surface. In addition, by making the press-fit guide surface a planar surface parallel to the first rotation limiting surface, the relative inclination, etc., when the inner shaft fitting and the press-fit fitting are press-fit is prevented easily through the contact between the press-fit guide surface and the second rotation limiting surface. In addition, by making both of the first rotation limiting surface and the press-fit guide surface planar, for example, the processing in the case of forming the first rotation limiting surface and the press-fit guide surface through cutting is simplified. Specifically, by making the first rotation limiting surface and the press-fit guide surface parallel to each other, the first rotation limiting surface and the press-fit guide surface are easily formed through cutting.

According to the fourth aspect, in the cylindrical vibration-damping device according to any one of the first to third aspects, a pair of first rotation limiting surfaces are provided on two sides of the inner shaft fitting in a radial direction, and a pair of second rotation limiting surfaces facing each other in the radial direction are provided on the inner circumferential surface of the insertion hole in the press-fit fitting, and the press-fit guide surface is provided on an axially outer side of each of the pair of first rotation limiting surfaces.

According to the cylindrical vibration-damping device configured according to the aspect, with a width across flats configuration formed by the pair of first rotation limiting surfaces and the pair of second rotation limiting surfaces, the relative rotation between the inner shaft fitting and the press-fit fitting can be effectively prevented.

Since the pair of second rotation limiting surfaces facing each other in the radial direction are provided in the press-fit fitting, the inner diameter of the insertion hole is reduced in the radial direction in which the pair of second rotation limiting surfaces are provided. Therefore, by respectively providing the press-fit guide surfaces on each of the axially outer sides of the pair of first rotation limiting surfaces, it is possible to easily insert the axial end of the inner shaft fitting in which the pair of press-fit guide surfaces are provided between the facing surfaces of the pair of second rotation limiting surfaces, and the inclination, etc., when the first rotation limiting surfaces are press-fit to the second rotation limiting surfaces can be avoided.

According to the fifth aspect, in the cylindrical vibration-damping device according to the fourth aspect, a portion deviated from the first rotation limiting surface in the circumferential direction on the outer circumferential surface of the inner shaft fitting is inserted into the insertion hole of the press-fit fitting in a non-press-fit state.

According to the cylindrical vibration-damping device configured according to the aspect, compared with the case where the inner shaft fitting is arranged in the press-fit state with respect to the press-fit fitting at the portion deviated from the first rotation limiting surface in the circumferential direction, the relative inclination between the inner shaft fitting and the press-fit fitting is likely to occur at the time of press-fitting, but by providing the press-fit guide surface on the inner shaft fitting, the inner shaft fitting and the press-fit fitting is easily press-fit and fixed properly.

According to the disclosure, it is possible to easily realize proper press-fit fixing between the inner shaft fitting and the press-fit fitting while preventing relative rotation between the inner shaft fitting and the press-fit fitting in the circumferential direction.

In the following, the embodiments of the disclosure will be described with reference to the drawings.

FIGS. 1 to 4 illustrate a dynamic damper 12 including a cylindrical linking body 10 as a first embodiment of the cylindrical vibration-damping device configured according to the disclosure. The cylindrical linking body 10 has a configuration in which an inner shaft fitting 14 and an outer cylindrical fitting 16, which is an outer cylindrical member, are elastically linked by a main rubber elastic body 18. In the following description, in principle, the upper-lower direction refers to the upper-lower direction in FIG. 4, the front-rear direction refers to the left-right direction in FIG. 4, which is an axial direction, and the left-right direction refers to the left-right direction in FIG. 1.

The inner shaft fitting 14 is arranged in a substantially cylindrical shape with a small diameter. The inner shaft fitting 14 is a member with a high rigidity that is formed by a metal material such as iron, an aluminum alloy, etc. In addition, the inner shaft fitting, for example, may also have a solid structure such as a circular columnar shape, and is not limited to being cylindrical.

A rear end (right end in FIG. 4) of the inner shaft fitting 14 is arranged as a press-fit part 20 with an outer diameter dimension smaller than the outer diameter dimension of the remaining portion of the inner shaft fitting 14. In the press-fit part 20, a pair of first rotation limiting surfaces 22, 22 are provided. In the first rotation limiting surface 22, the curvature is reduced compared with portions deviated from the first rotation limiting surface 22 on two sides in the circumferential direction on the outer circumferential surface of the inner shaft fitting 14. The first rotation limiting surface 22 of the embodiment is a planar surface with a curvature that is substantially 0. The pair of first rotation limiting surfaces 22, 22 are provided on two sides in the upper-lower direction that is the radial direction of the inner shaft fitting 14, and expand to be respectively substantially orthogonal to the upper-lower direction and substantially parallel to the axial direction. In the portion where the pair of first rotation limiting surfaces 22, 22 are formed, the inner shaft fitting 14 is arranged in an elongated outer circumferential shape whose outer diameter dimension in the upper-lower direction is smaller than the outer diameter dimension in the left-right direction.

On the axially outer side with respect to the pair of first rotation limiting surfaces 22,22 in the inner shaft fitting 14, a pair of press-fit guide surfaces 24, 24 are provided. In the press-fit guide surface 24, the curvature is reduced compared with portions deviated from the press-fit guide surface 24 on two sides in the circumferential direction on the outer circumferential surface of the inner shaft fitting 14. The press-fit guide surface 24 of the embodiment is a planar surface with a curvature that is substantially 0. The pair of press-fit guide surfaces 24, 24 are provided on two sides in the upper-lower direction that is the radial direction of the inner shaft fitting 14, and expand to be respectively substantially orthogonal to the upper-lower direction and substantially parallel to the axial direction. Accordingly, the press-fit guide surfaces 24 are respectively formed on the axially outer side of the pair of first rotation limiting surfaces 22, 22, and the first rotation limiting surfaces 22 and the press-fit guide surfaces 24 expand to be substantially parallel to each other. In the portion where the pair of press-fit guide surfaces 24, 24 are formed, the inner shaft fitting 14 is arranged in an elongated outer circumferential shape whose outer diameter dimension in the upper-lower direction is smaller than the outer diameter dimension in the left-right direction.

The first rotation limiting surface 22 and the press-fit guide surface 24 are provided at adjacent positions in the axial direction of the inner shaft fitting 14, and the first rotation limiting surface 22 and the press-fit guide surface 24 are connected by a stepped surface 26. The stepped surface 26 is arranged in a planar shape expanding in an axis right angle direction, connected to the first rotation limiting surface 22 with the outer circumferential edge, and connected to the press-fit guide surface 24 with the inner circumferential edge. In the embodiment, since the first rotation limiting surface 22 and the press-fit guide surface 24 expand in the axial direction, the stepped surface 26 is orthogonal to the first rotation limiting surface 22 and the press-fit guide surface 24, and the continuous portions of the stepped surface 26 with the first rotation limiting surface 22 and the press-fit guide surface 24 form a right angle.

Figure 5:
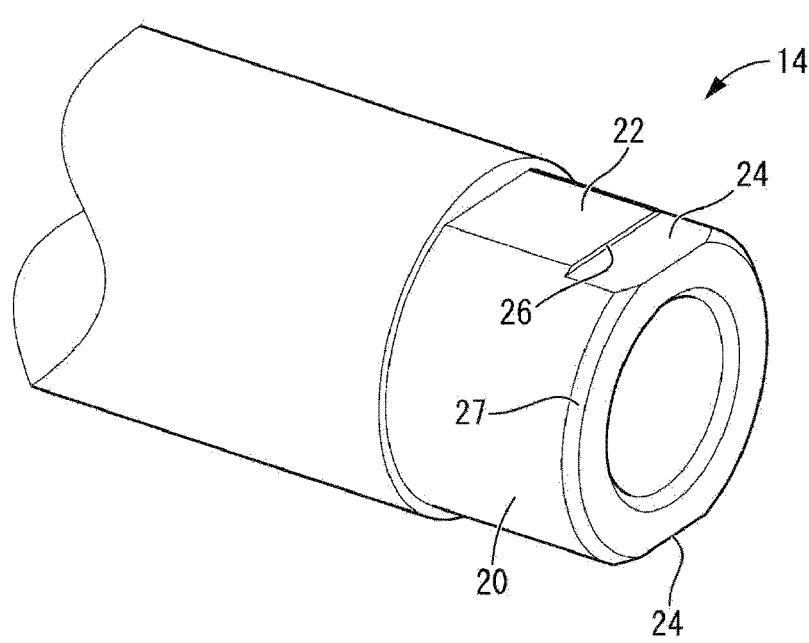
FIG. 5 is a perspective view illustrating an axial end of an inner shaft fitting forming the dynamic damper shown in FIG. 1.
Figure 6:
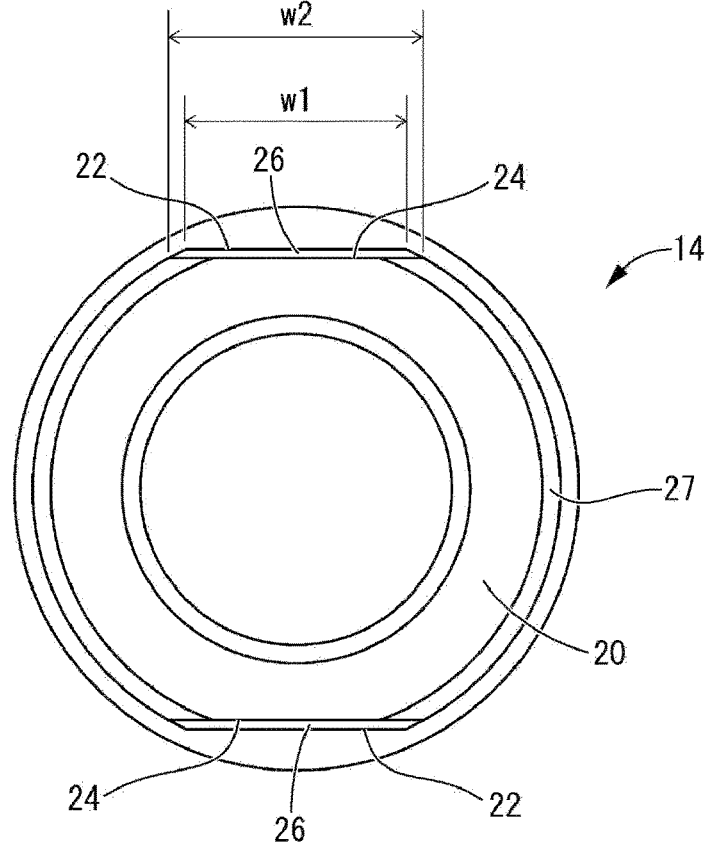
FIG. 6 is a rear view of the inner shaft fitting shown in FIG. 5.
Figure 8A:
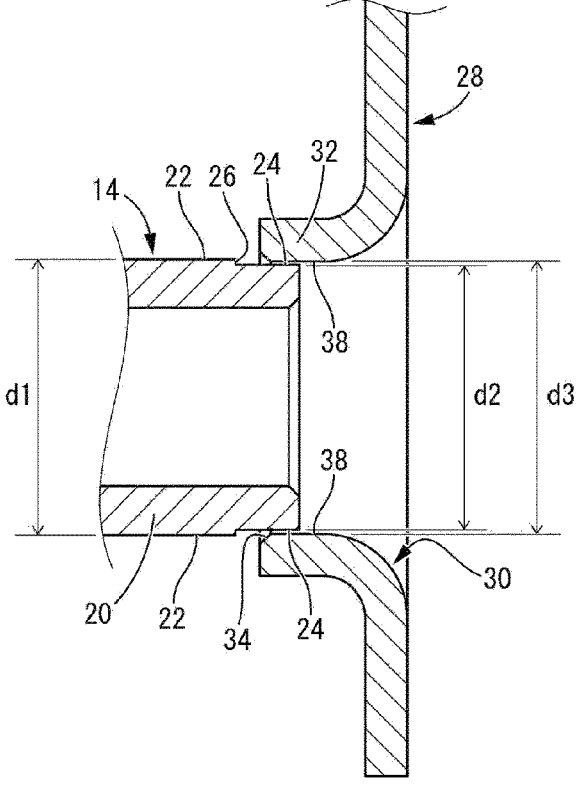
FIG. 8A is a partial cross-sectional view illustrating a press-fit process of the inner shaft fitting to the positioning fitting in the dynamic damper shown in FIG. 1, and is a view illustrating a state in which a pair of press-fit guide surfaces are inserted between a pair of second rotation limiting surfaces.

The press-fit guide surface 24 is provided on the central side (a position near a central line L) of the inner shaft fitting 14 with respect to the first rotation limiting surface 22 in the upper-lower direction, and a distance $d2$ between the pair of press-fit guide surfaces 24, 24 is arranged to be shorter than a distance $d1$ between the pair of first rotation limiting surfaces 22,22 (i.e., $d2 < d1$, see FIG. 8A). As shown in FIGS. 5 and 6, the first rotation limiting surface 22 and the press-fit guide surface 24 both expand till the left and right ends of the inner shaft fitting 14, and form subtenses on an axis right angle cross-section of the inner shaft fitting 14. Accordingly, a width dimension w2 of the press-fit guide surface 24, which is provided at a position closer to the central line L of the inner shaft fitting 14, in the left-right direction is set to be greater than a width dimension w1 of the first rotation limiting surfaces 22 in the left right direction (i.e., w1<w2). The press-fit guide surface 24 has a smaller length dimension in the axial direction than the first rotation limiting surface 22.

On the outer circumferential surface between the press-fit guide surfaces 24, 24 of the inner shaft fitting 14 in the circumferential direction, a tapered surface 27 that is chamfered is provided on the axial end edge. The diameter of the tapered surface 27 is reduced toward the press-fit tip side (front side), and allows easy insertion into an insertion hole 30 of a positioning fitting 28 to be described afterwards.

Figure 7:
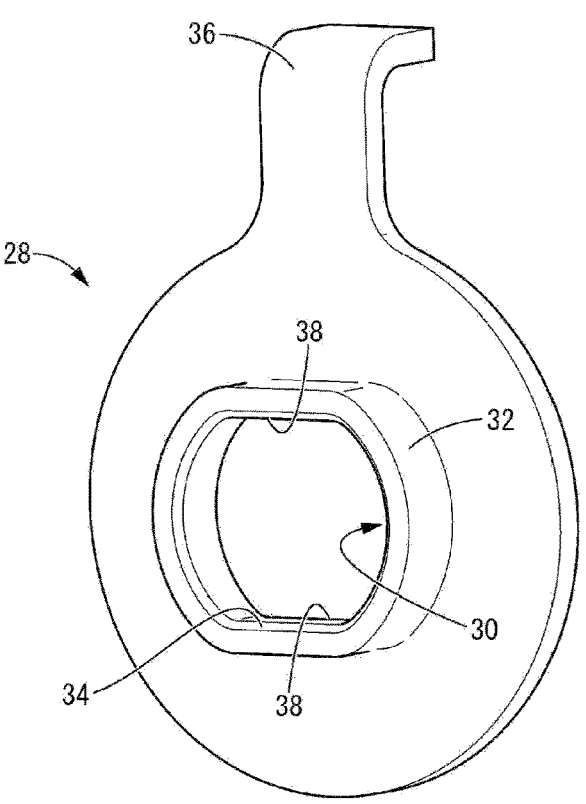
FIG. 7 is a perspective view illustrating a positioning fitting forming the dynamic damper shown in FIG. 1.

The positioning fitting 28 as a press-fit fitting is installed to the press-fit part 20 of the inner shaft fitting 14. As shown in FIG. 7, the positioning fitting 28 is arranged in a substantially ring-shaped plate shape, and provided with the insertion hole 30 penetrating through the positioning fitting 28 in a thickness direction. A cylindrical part 32 protruding in the thickness direction is provided at a circumferential edge part of the insertion hole 30, and a front-rear length dimension of the insertion hole 30 that is an inner hole of the cylindrical part 32 is secured. A guide inclination surface 34 that expands in diameter forward is provided at the front end of the inner circumferential surface of the cylindrical part 32. The guide inclination surface 34 is an inclination surface chamfered and provided at the inner circumferential edge at the front end of the cylindrical part 32, and is at least provided at portions where a pair of second rotation limiting surfaces 38, 38 to be described afterwards are formed. In the embodiment, the guide inclination surface 34 is provided continuously over the entire circumference. The guide inclination surface 34 has a length dimension in the axial direction smaller than the press-fit guide surface 24 of the inner shaft fitting 14.

In addition, the positioning fitting 28 includes a positioning part 36 extending from a portion in the circumferential direction toward the outer circumference. In the positioning part 36, an extending tip portion protrudes rearward, and by inserting the extending tip portion into a concave part 46 of a vibration-damping target 44 to be described afterwards, the positioning fitting 28 is positioned in the circumferential direction with respect to the vibration-damping target 44. The positioning fitting 28 of the embodiment is arranged as a press-fit fitting, and the entirety including the cylindrical part 32 and the positioning part 36 is formed integrally.

On the inner circumferential surface of the insertion hole 30 of the positioning fitting 28, the pair of second rotation limiting surfaces 38, 38 are provided. The second rotation limiting surface 38 has a shape corresponding to the first rotation limiting surface 22, and also has a curvature smaller than a portion deviated in the circumferential direction. The second rotation limiting surface 38 of the embodiment is arranged as a planar surface corresponding to the first rotation limiting surface 22. The pair of second rotation limiting surfaces 38, 38 are provided to face each other in the upper-lower direction on the inner circumferential surface of the insertion hole 30 of the positioning fitting 28, and the inner diameter dimension of the insertion hole 30 is smaller in the upper-lower direction, which is the facing direction of the pair of second rotation limiting surfaces 38, 38, than in the left-right direction. The second rotation limiting surface 38 has a smaller axial dimension than the first rotation limiting surface 22. In the embodiment, the positioning fitting 28 is arranged as a press-fit fitting, and the base end portion of the cylindrical part 32 is arranged in a curved shape. Therefore, the planar second rotation limiting surface 28 is not provided at a rear end portion of the insertion hole 30 formed by the base end portion of the cylindrical part 32, but is provided at a front part (excluding the guide inclination surface 34) of the insertion hole 30.

A distance d3 between the pair of two rotation limiting surfaces 38, 38 shown in FIG. 8A is smaller than the distance d1 between the pair of first rotation limiting surfaces 22, 22 (i.e., d3<d1), and greater than the distance d2 between the pair of press-fit guide surfaces 24, 24 (i.e., d2<d3). The inner diameter dimension of the insertion hole 30 between the pair of second rotation limiting surfaces 38, 38 in the circumferential direction is greater than the outer diameter dimension of the inner shaft fitting 14 between the pair of first rotation limiting surfaces 22, 22 in the circumferential direction.

The press-fit part 20 of the inner shaft fitting 14 is inserted into the insertion hole 30 of the positioning fitting 28, and the positioning fitting 28 is installed to the inner shaft fitting 14 in an externally inserted state. In the embodiment, the positioning fitting 28 is fixed to the outer circumferential surface of the inner shaft fitting 14 by superimposing the pair of first rotation limiting surfaces 22, 22 of the inner shaft fitting 14 to the pair of second rotation limiting surfaces 38, 38 of the positioning fitting 28 in a press-fit state. The two sides deviated from the pair of first rotation limiting surfaces 22, 22 in the circumferential direction on the outer circumferential surface of the inner shaft fitting 14, for example, may be mutually separated with respect to the two sides deviated from the pair of second rotation limiting surfaces 38, 38 in the circumferential direction on the inner circumferential surface of the insertion hole 30 of the positioning fitting 28. Alternatively, the two sides deviated from the pair of first rotation limiting surfaces 22, 22 in the circumferential direction on the outer circumferential surface of the inner shaft fitting 14, for example, may also be arranged in a state of contacting the two sides deviated from the pair of second rotation limiting surfaces 38, 38 in the circumferential direction on the inner circumferential surface of the insertion hole 30 of the positioning fitting 28 at a contact pressure smaller than the contact pressure between the first rotation limiting surface 22 and the second rotation limiting surface 38.

When the press-fit part 20 of the inner shaft fitting 14 is press-fit into the insertion hole 30 of the positioning fitting 28, firstly, as shown in FIG. 8A, the positioning fitting 28 approaches the inner shaft fitting 14 in a direction from the rear to the front, and an axially outer end of the press-fit part 20 including the pair of press-fit guide surfaces 24, 24 is inserted into the insertion hole 30. The length dimension of the press-fit guide surface 24 in the axial direction is greater than the length dimension of the guide inclination surface 34 of the positioning fitting 28. Therefore, the axial end of the press-fit part 20 including the pair of press-fit guide surfaces 24, 24 is inserted to an extent that is between the facing surfaces of the pair of second rotation limiting surfaces 38, 38 in the insertion hole 30.

The distance d3 between the pair of second rotation limiting surfaces 38, 38 is greater than the distance d2 between the pair of press-fit guide surfaces 24, 24, and the inner diameter dimension of the insertion hole 30 between the pair of second rotation limiting surfaces 38, 38 in the circumferential direction is greater than the outer diameter dimension of the press-fit part 20 between the pair of press-fit guide surfaces 24, 24 in the circumferential direction. Therefore, the axial end of the press-fit part 20 including the pair of press-fit guide surfaces 24, 24 is easily inserted into the insertion hole 30 with a gap.

Then, in the state in which the axial end of the press-fit part 20 including the pair of press-fit guide surfaces 24, 24 is inserted into the insertion hole 30 of the positioning fitting 28, the positioning fitting 28 is further moved forward with respect to the inner shaft fitting 14. By inserting the axial end of the press-fit part 20 including the press-fit guide surfaces 24, 24 into the insertion hole 30, relative inclination or relative position deviation in the axis right angle direction between the inner shaft fitting 14 and the positioning fitting 28 is limited, and the inner shaft fitting 14 and the positioning fitting 28 can be moved in an appropriate position relationship and orientations.

Figure 8B:
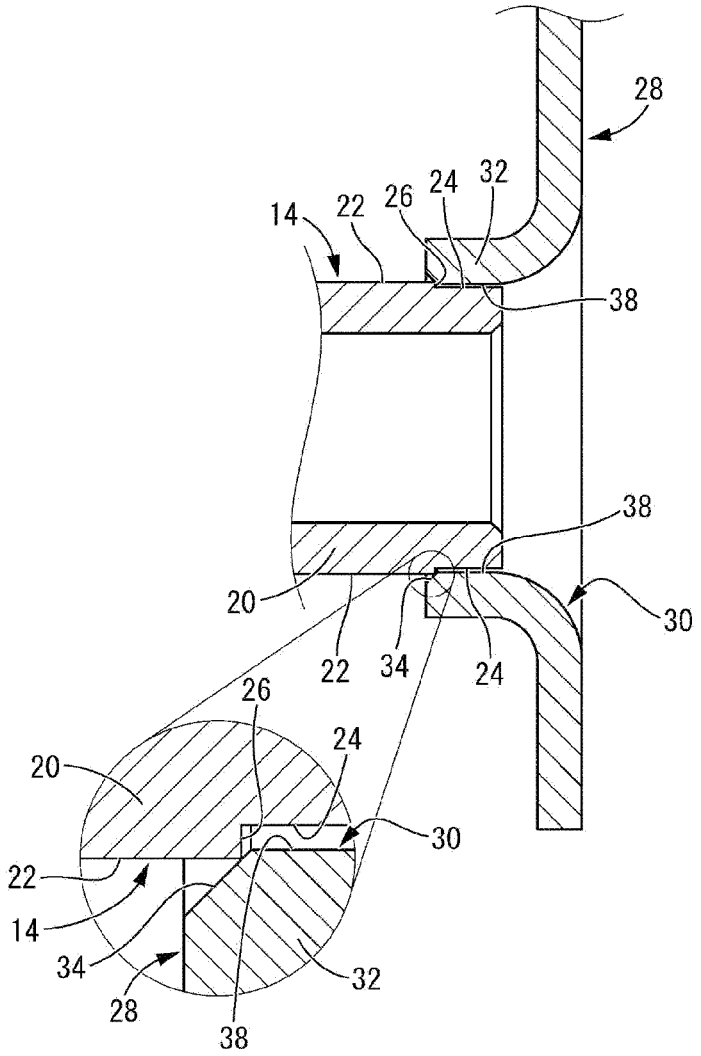
FIG. 8B is a partial cross-sectional view illustrating the press-fit process of the inner shaft fitting to the positioning fitting in the dynamic damper shown in FIG. 1, and is a view illustrating a state in which an end edge of a stepped surface contacts a guide inclination surface.

In addition, if the positioning fitting 28 is further moved forward with respect to the inner shaft fitting 14, as shown in FIG. 8B, the outer circumferential end edge of the stepped surface 26 contacts the guide inclination surface 34 of the cylindrical part 32 in the axial direction. Such contact portion extends linearly in the circumferential direction (a paper vertical direction of FIG. 8B). Therefore, through such contact, the positioning fitting 28 and the inner shaft fitting 14 are properly aligned to each other in the circumferential direction. That is, when the insertion of FIG. 8A starts, the width dimension of the second rotation limiting surface 38 in the circumferential direction is smaller than the width dimension w2 of the press-fit guide surface 24 in the circumferential direction, and the positioning fitting 28 is permitted with a certain degree of freedom for the relative position with respect to the inner shaft fitting 14 in the circumferential direction, thereby easily achieving the insertion operation of the positioning fitting 28 with respect to the inner shaft fitting 14. However, by bringing the outer circumferential end edge of the stepped surface 26 into contact with the guide inclination surface 34 of the cylindrical part 32, it is possible to easily and accurately align the positioning fitting 28 and the inner shaft fitting 14 in the circumferential direction.

In addition, with the outer circumferential end edge of the stepped surface 26 being guided into the insertion hole 30 along the guide inclination surface 34, the position of the inner shaft fitting 14 with respect to the insertion hole 30 in the upper-lower direction is defined, and the inner shaft fitting 14 is easily arranged at an appropriate position with respect to the insertion hole 30. In the embodiment, the stepped surface 26 is substantially orthogonal to the first rotation limiting surface 22, and the outer circumferential end edge of the stepped surface 26 forms a corner. Therefore, the outer circumferential end edge of the stepped surface 26 is easily guided through the contact to the guide inclination surface 34.

From the state in which the stepped surface 26 contacts the guide inclination surface 34 as shown in FIG. 8B, the positioning fitting 28 is further moved forward with respect to the inner shaft fitting 14, and the press-fit part 20 of the inner shaft fitting 14 is press-fit into the insertion hole 30 of the positioning fitting 28. Since the distance d1 between the pair of first rotation limiting surfaces 22, 22 is greater than the distance d3 between the pair of second rotation limiting surfaces 38, 38, the portions where the pair of first rotation limiting surfaces 22, 22 are formed in the press-fit part 20 are press-fit in between the facing surfaces of the pair of second rotation limiting surfaces 38, 38. Accordingly, the first rotation limiting surface 22 is superimposed to the second rotation limiting surface 38 in the contact state. By making the diameter of the pair of first rotation limiting surfaces 22, 22 in the circumferential direction on the outer circumferential surface of the press-fit part 20 smaller than the diameter between the pair of second rotation limiting surfaces 38, 38 in the circumferential direction on the inner circumferential surface of the insertion hole 30, a non-press-fit state may be obtained. Still, it is also possible to the space between the pair of first rotation limiting surfaces 22, 22 in the circumferential direction in a contact state or a press-fit state. By doing so, the fixing force of the positioning fitting 28 with respect to the inner shaft fitting 14 can be further increased.

Figure 4:
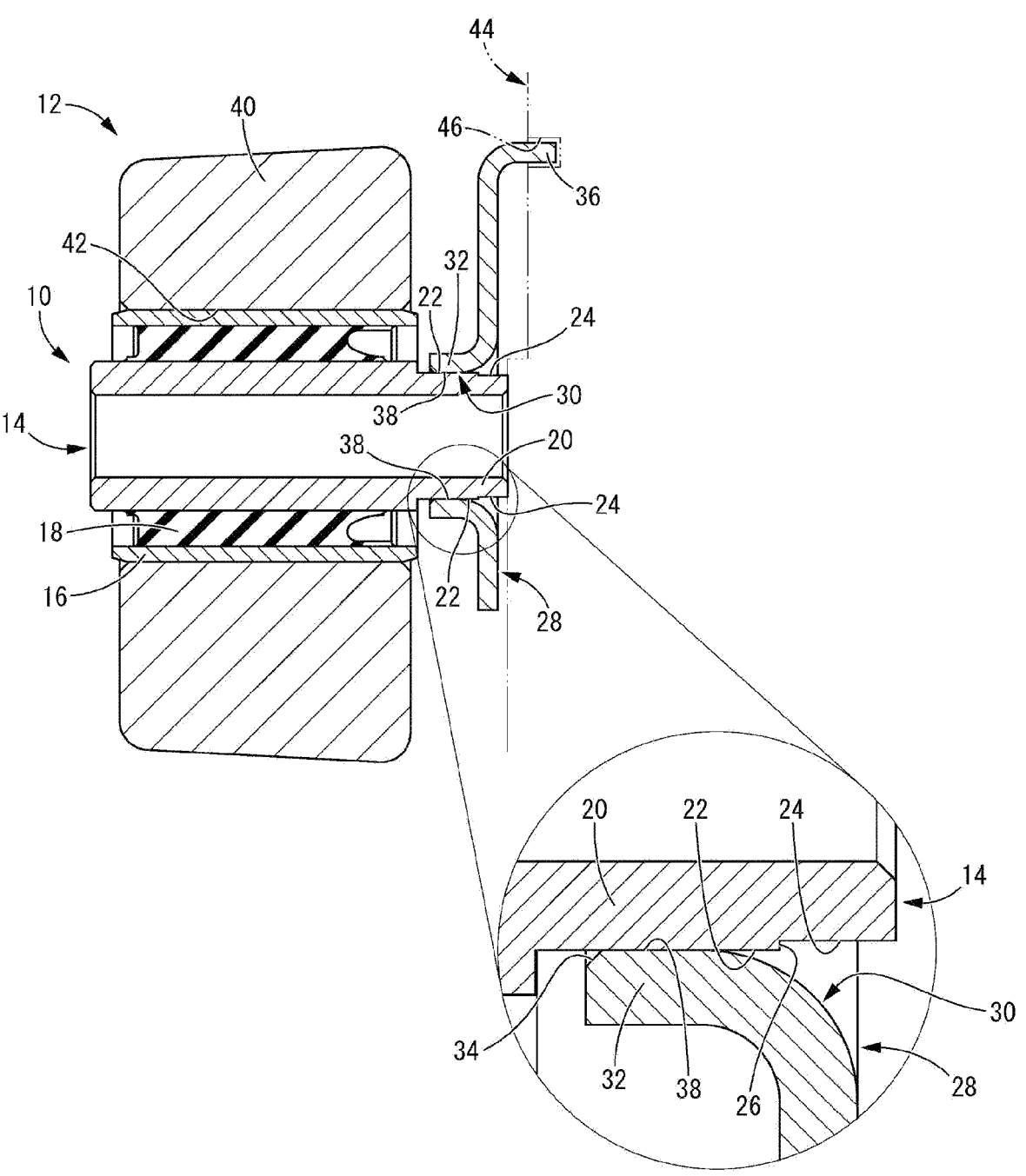
FIG. 4 is a cross-sectional view taken along IV-IV of FIG. 1.

As shown in FIGS. 1 and 4, the outer cylindrical fitting 16 is in a substantially cylindrical shape that is thinner and has a greater diameter than the inner shaft fitting 14. The outer cylindrical fitting 16 of the embodiment is a member with a high rigidity that is formed by the same metal material as the inner shaft fitting 14. The outer cylindrical fitting 16 has an axial dimension smaller than the inner shaft fitting 14. Specifically, the outer cylindrical fitting 16 has an axial dimension smaller than a portion of the inner shaft fitting 14 excluding the press-fit part 20. The outer circumferential surfaces at two ends of the outer cylindrical fitting 16 in the axial direction are arranged in a taper shape with a reduced diameter toward the radially outer side.

The inner shaft fitting 14 is inserted through the inner circumference of the outer cylindrical fitting 16, and the main rubber elastic body 18 is arranged between the inner shaft fitting 14 and the outer cylindrical fitting 16 in the radial direction. The main rubber elastic body 18 is formed in a thick cylindrical shape, the inner circumferential surface of the main rubber elastic body 18 is fixed to the outer circumferential surface of the portion of the inner shaft fitting 14 excluding the press-fit part 20, and the outer circumferential surface of the main rubber elastic body 18 is fixed to the inner circumferential surface of the outer cylindrical fitting 16. The main rubber elastic body is formed as an integrally vulcanized molded article including the inner shaft fitting 14 and the outer cylindrical fitting 16, and the inner shaft fitting 14 and the outer cylindrical fitting 16 are elastically linked by the main rubber elastic body 18. In addition, by reducing the diameter of the outer cylindrical fitting 16 after the vulcanized molding of the main rubber elastic body 18, the tensile strain due to cooling shrinkage after the main rubber elastic body 18 is molded can be reduced.

The cylindrical linking body 10 so configured forms the dynamic damper 12 by installing a mass fitting 40 to the outer cylindrical fitting 16. As shown in FIGS. 1 to 4, the mass fitting 40 is arranged in a block shape, and is formed with an installation hole 42 penetrating through the mass fitting 40 in the front-rear direction. In addition, the cylindrical linking body 10 is inserted into the installation hole 42, and the outer cylindrical fitting 16 is press-fit and fixed into the installation hole 42. Although the material for forming the mass fitting 40 is not particularly limited, the mass fitting 40 may be formed by a material with a greater specific gravity, such as iron, thereby being able to realize a required mass in a relatively small volume. It is noted that the specific shape of the mass fitting 40 and the size with respect to the cylindrical linking body 10 shown in the embodiment merely serve as an example, and the specific size, the shape, etc., may be set as appropriate in accordance with the mass of the vibration-damping target 44 or the vibration frequency of the vibration-damping target, the shape of the arrangement space of the dynamic damper 12, etc., to be described afterwards.

The dynamic damper 12 suppresses the vibration of the vibration-damping target 44 by installing the inner shaft fitting 14 to the vibration-damping target 44, such as a vehicle body, as shown in FIG. 4. The inner shaft fitting 14, for example, is fixed to the vibration-damping target 44 through an installation bolt (not shown) inserted through a central hole. In addition, by inserting the positioning part 36 of the positioning fitting 28 press-fit and fixed to the inner shaft fitting 14 into the concave part 46 of the vibration-damping target 44, the orientation of the dynamic damper 12 in the circumferential direction with respect to the vibration-damping target 44 is defined.

For example, in the state in which the positioning fitting 28 is positioned in the circumferential direction with respect to the vibration-damping target 44, when the inner shaft fitting 14 is fixed with respect to the vibration-damping target 44 by tightening of the installation bolt, a force in the circumferential direction (tightening torque) due to tightening of the installation bolt may act between the inner shaft fitting 14 and the positioning fitting 28. Here, the inner shaft fitting 14 and the positioning fitting 28 are positioned with respect to each other in the circumferential direction through contact between the pair of first rotation limiting surfaces 22, 22 and the pair of second rotation limiting surfaces 38, 38, and the relative rotation in the circumferential direction is limited. Accordingly, even if an external force in the circumferential direction, such as the tightening torque, acts on the dynamic damper 12, the dynamic damper 12 is still held in an appropriate orientation in the circumferential direction with respect to the vibration-damping target 44.

Conventionally, the dynamic damper 12 reduces the vibration energy of the vibration-damping target 44 through resonance of a mass spring system formed by the mass fitting 40, the outer cylindrical fitting 16, and the main rubber elastic body 18. The resonance frequency of the mass spring system, for example, is tuned to a frequency of the vibration of the vibration-damping target input from the vibration-damping target 44 to the dynamic damper 12.

Since the inner shaft fitting 14 of the dynamic damper 12 is positioned in the circumferential direction with respect to the vibration-damping target 44 via the positioning fitting 28, even if a vibration load is input repetitively from the vibration-damping target 44, the dynamic damper 12 is held in an appropriate orientation with respect to the vibration-damping target 44.

Although the embodiments of the disclosure have been described above in detail, the disclosure is not limited to such detailed description. For example, in the embodiment, a configuration in which the outer cylindrical fitting 16 made by metal is press-fit and fixed to the mass fitting 40 is shown. However, the outer cylindrical member may also be formed by a material other than metal, such as synthetic resin.

In the embodiment, a width across flats configuration in which the pair of first rotation limiting surfaces 22, 22 are shown. However, the number of the first rotation limiting surface 22 may be one, and may also be three or more. In addition, in the case where multiple first rotation limiting surfaces 22 are provided, the width dimensions or curvatures in the circumferential direction thereof may also be different from each other. The same applies to the press-fit guide surface 24 and the second rotation limiting surface 38.

Although the first rotation limiting surface 22 is arranged as a planar surface in the embodiment, the first rotation limiting surface 22 may also be arranged as, for example, a curved surface curved in the circumferential direction to convex toward the outer circumference or a curved surface curved in the circumferential direction to concave toward the outer circumference. In the case where the first rotation limiting surface 22 is a curved surface, the second rotation limiting surface 38 may be arranged as a curved surface in correspondence with the first rotation limiting surface 22.

The press-fit guide surface 24 is not limited to a planar surface as long as the press-fit guide surface 24 is located on the central side of the inner shaft fitting 14 with respect to the first rotation limiting surface 22, and may also be a curved surface, a bent surface, etc. In addition, by forming the press-fit guide surface 24 by using an inclination surface inclined to the inner circumferential side toward the axially outer side (press-fit tip side) of the inner shaft fitting 14, the press-fit guide surface 24 can be easily inserted into the insertion hole 30.

The stepped surface 26 connecting the first rotation limiting surface 22 and the press-fit guide surface 24 is not necessarily limited to a planar surface expanding in the axis right angle direction. For example, the stepped surface 26 may also be arranged as an overhang inclined surface in which the end edge on the side of the first rotation limiting surface 22 (outer circumferential end edge) protrudes toward the press-fit tip side with respect to the end edge on the side of the press-fit guide surface 24 (inner circumferential end edge). In addition, the stepped surface 26 may also be configured as an inclined surface inclined to the inner circumferential side toward the press-fit tip side. In such case, the guide inclination surface 34 like the positioning fitting 28 of the embodiment is not provided, and the first rotation limiting surface 22 can be guided toward the inner side of the second rotation limiting surface 38 through the guiding effect of the stepped surface 26. By setting the press-fit guide surface 24 as an inclined surface inclined to the inner circumferential side toward the press-fit tip side, and setting the stepped surface 26 as an inclined surface inclined to the inner circumferential side toward the press-fit tip side, the press-fit guide surface 24 and the stepped surface 26 can also be configured by using one inclined plane.

In the embodiment, the pair of first rotation limiting surfaces 22, 22 of the inner shaft fitting 14 is press-fit into the insertion hole 30, and the portion of the inner shaft fitting 14 between the pair of first rotation limiting surfaces 22, 22 in the circumferential direction is inserted into the insertion hole 30 in a non-press-fit state. However, for example, the inner shaft fitting 14 may also be press-fit into the insertion hole 30 over the entire circumference including the pair of first rotation limiting surfaces 22, 22. Nevertheless, in the case where the inner shaft fitting 14 is press-fit into the insertion hole 30 over the entire circumference as well, when the press-fit tip part including the press-fit guide surfaces 24, 24 is inserted into the insertion hole 30, it may be that the portion of the inner shaft fitting 14 between the press-fit guide surfaces 24, 24 in the circumferential direction is not press-fit into the insertion hole 30.

The press-fit fitting is not limited to the positioning fitting 28 shown in the embodiment. For example, the press-fit fitting may also be a stopper fitting limiting a relative displacement amount in the axial direction between the inner shaft fitting and the outer cylindrical member through contact with the side of the outer cylindrical member, a fail-safe fitting that prevents the mass fitting from falling off when the rubber elastic body is broken. In addition, it may also be that the press-fit fitting is not a press fitting of the embodiment. For example, the press-fit fitting may also be a fitting in a thick plate shape or a block shape formed through casting, etc.

In the embodiment, a cylindrical vibration-damping device used as the cylindrical linking body 10 forming the dynamic damper 12 is described. However, for example, the configuration of the disclosure is also applicable to a cylindrical vibration-damping device, such as a suspension bush, an engine mount, a differential mount, etc., in which vibration-damping linking targets are respectively installed to the inner shaft fitting and the outer cylindrical member to establish vibration-damping linking of the vibration-damping linking targets.

What is claimed is:

1. A cylindrical vibration-damping device having a radial direction, a left-right direction and an axial direction orthogonal with each other, comprising:

an inner shaft fitting, having a central side and an outer side opposite to the central side in the radial direction;

an outer cylindrical member; and a main rubber elastic body, elastically linking the inner shaft fitting and the outer cylindrical member, wherein a press-fit fitting is installed to a press-fit part of the inner shaft fitting, wherein the inner shaft fitting is in a substantially cylindrical shape, and the inner shaft fitting includes a first rotation limiting surface and a press-fit guide surface, and the press-fit fitting is provided with an insertion hole penetrating through the press-fit fitting in the axial direction, and a cylindrical part protruding in the axial direction is provided at a circumferential edge part of the insertion hole, and the press-fit fitting includes a second rotation limiting surface, wherein the first rotation limiting surface has a first curvature that is reduced compared with portions deviated from the first rotation limiting surface on two sides in a circumferential direction on an outer circumferential surface of the inner shaft fitting, and the press-fit fitting is installed to the outer circumferential surface of the inner shaft fitting comprising the first rotation limiting surface, wherein the second rotation limiting surface has a second curvature that is reduced compared with portions deviated from the second rotation limiting surface on two sides in the circumferential direction on an inner circumferential surface of the insertion hole of the press-fit fitting into which the inner shaft fitting is inserted, wherein the second curvature of the second rotation limiting surface is in correspondence with the first curvature of the first rotation limiting surface, the first rotation limiting surface of the inner shaft fitting and the second rotation limiting surface of the press-fit fitting are superimposed to each other to be arranged in a press-fit state, and the press-fit guide surface is located on the central side of the inner shaft fitting with respect to the first rotation limiting surface located on the outer side of the inner shaft fitting in the radial direction, the press-fit guide surface has a width dimension in the left-right direction greater than that of the first rotation limiting surface, and the press-fit guide surface provided on an axially end of the first rotation limiting surface is provided on the outer circumferential surface of the inner shaft fitting.

2. The cylindrical vibration-damping device as claimed in claim 1, wherein the first rotation limiting surface and the press-fit guide surface are connected by a stepped surface expanding in an axis right angle direction of the inner shaft fitting, on the inner circumferential surface of the insertion hole in the press-fit fitting, a guide inclination surface guiding the first rotation limiting surface into the insertion hole through contact of an end edge on a side of the first rotation limiting surface in the stepped surface is provided at an axial end edge part.

3. The cylindrical vibration-damping device as claimed in claim 1, wherein the first rotation limiting surface is arranged as a planar surface expanding in parallel with the axial direction of the inner shaft fitting, and the press-fit guide surface is arranged as a planar surface expanding in parallel with the first rotation limiting surface.

4. The cylindrical vibration-damping device as claimed in claim 1, wherein a pair of first rotation limiting surfaces are provided on two sides of the inner shaft fitting in the radial direction, and a pair of second rotation limiting surfaces facing each other in the radial direction are provided on the inner circumferential surface of the insertion hole in the press-fit fitting, and the press-fit guide surface is provided on an axially end of each of the pair of first rotation limiting surfaces.

5. The cylindrical vibration-damping device as claimed in claim 4, wherein the portions deviated from the first rotation limiting surface on two sides in the circumferential direction on the outer circumferential surface of the inner shaft fitting are inserted into the insertion hole of the press-fit fitting in a non-press-fit state.

6. The cylindrical vibration-damping device as claimed in claim 2, wherein the first rotation limiting surface is arranged as a planar surface expanding in parallel with the axial direction of the inner shaft fitting, and the press-fit guide surface is arranged as a planar surface expanding in parallel with the first rotation limiting surface.

7. The cylindrical vibration-damping device as claimed in claim 2, wherein a pair of first rotation limiting surfaces are provided on two sides of the inner shaft fitting in the radial direction, and a pair of second rotation limiting surfaces facing each other in the radial direction are provided on the inner circumferential surface of the insertion hole in the press-fit fitting, and the press-fit guide surface is provided on an axially end of each of the pair of first rotation limiting surfaces.

8. The cylindrical vibration-damping device as claimed in claim 3, wherein a pair of first rotation limiting surfaces are provided on two sides of the inner shaft fitting in the radial direction, and a pair of second rotation limiting surfaces facing each other in the radial direction are provided on the inner circumferential surface of the insertion hole in the press-fit fitting, and the press-fit guide surface is provided on an axially end of each of the pair of first rotation limiting surfaces.

\* \* \* \* \*